United States Patent Office 3,412,712
Patented Nov. 26, 1968

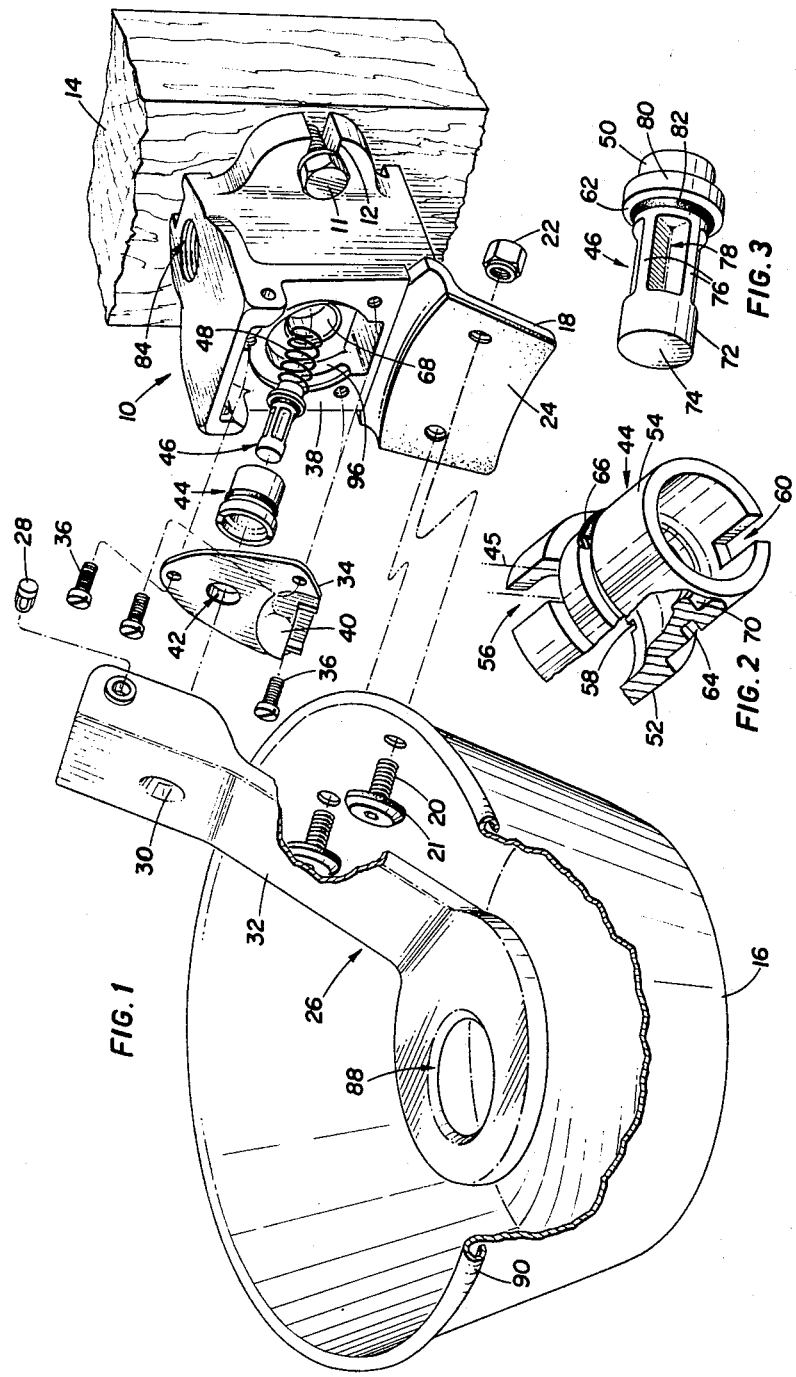

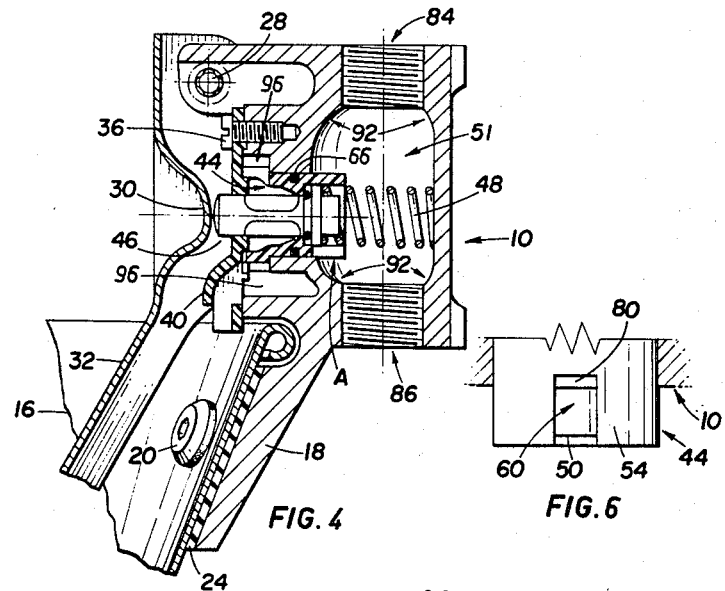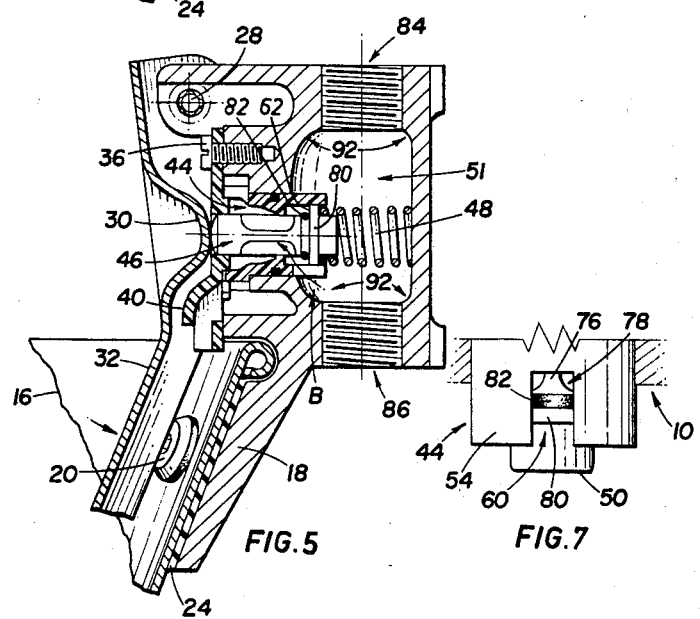

3,412,712
ANIMAL WATERING PAN
Ronald William Taylor, Guelph, Ontario, Canada, assignor to General Steel Wares Limited, Toronto, Ontario, Canada
Filed July 1, 1966, Ser. No. 562,161
6 Claims. (Cl. 119—75)

ABSTRACT OF THE DISCLOSURE

A valve assembly, particularly adapted for use in an animal watering pan wherein the animal actuates the flow of water by pressing a plate with its nose, having a valve stem and sleeve arrangement whereby the stem moves axially within the sleeve and opens and closes a slot at the inner end of the sleeve to permit water to flow from the interior of the valve body and past the valve stem through the sleeve. The water flows from the valve sleeve into an exterior cavity formed behind a cover plate on the outside of the valve body, and thence from the exterior cavity.

---

This invention relates to an animal watering pan, and more particularly to a watering pan into which water flows only as the animal drinks from the pan.

When watering animals with pans or bowls from which only one animal may drink at any one time, especially larger animals such as cattle and swine, it is desirable that the water in the pan be fresh when it is to be consumed. Control of the flow of water into the pan is therefore necessary, which control is operable by the animal. It is necessary, however, that as the water flows into the pan while the animal is drinking there should be no splashing of the water in the pan, otherwise the animal will withdraw or shake its head, causing water to splash in the vicinity of the bowl, but externally of it. In cold weather, the spilled water may freeze; and in warmed weather, the spilled water may cause mud to form in the vicinity of the bowl.

When water flow is suddenly shut off, the kinetic energy developed in the system, known as "water hammer," can rupture the pipes or parts in a pressure water system and can cause annoyance and disturbance from the noise created by such water hammer. It has been necessary, therefore, to develop a valve arrangement which automatically and independently of the manner in which it is operated will reduce the flow of water through the valve from full to zero flow, thus allowing the kinetic energy to dissipate gradually and thereby virtually eliminating the chances for water hammer to develop.

It has also been found that the pressure of water systems on farms varies from several p.s.i. to ordinary household pressure of 60–80 p.s.i. to well over that pressure, and in fact, up to several hundred p.s.i. It is therefore expedient to develop a valve arrangement which will accommodate the wide pressure ranges found from system to system merely by altering or replacing one or two simple and inexpensive parts of that assembly.

It is an object of this invention to provide a watering pan into which water is introduced only as the animal drinks from it.

It is a further object of this invention to provide a watering pan in which little or no splash occurs as the pan fills from a pressure water source.

It is a still further object of this invention to provide a self-closing valve construction which eliminates the presence of water hammer as the valve is closed.

Yet another object of the invention is to provide a valve construction and water cavity which is unaffected by pressure of the water supply; and which will withstand freezing temperatures.

These and other features and objects of the invention will become more evident in the following discussion in relation with the accompanying drawings, which drawings illustrate a preferred embodiment of the invention, and in which:

FIGURE 1 is an exploded view of an animal watering pan according to the present invention;
FIGURE 2 is an oblique view in partial cross-section of the valve sleeve;
FIGURE 3 is an oblique view of the valve stem;
FIGURE 4 is a partial cross-sectional view taken along the vertical mid-section of the valve housing showing the valve in its closed position;
FIGURE 5 is a partial cross-section as in FIGURE 4 showing the valve in an open position;
FIGURE 6 is a partial underside view looking upwards at A in FIGURE 4; and,
FIGURE 7 is a partial underside view looking upwards at B in FIGURE 5.

The drawings illustrate a preferred embodiment of the animal watering pan of the present invention. The embodiment shown is especially adapted for use by cattle or other large animals.

A valve body 10 is securely held by bolts or screws 11 in slots 12 to a support member 14. The nature of support 14 is not important as it merely provides locating means whereby the animal pan according to this invention may be placed in a position advantageous to the animals to be watered. A bowl 16 is securely attached to flange 18 of valve body 10 by bolt and nut means 20, 22. In the preferred embodiment of the present animal watering pan, bowl 16 is made of porcelained enamel over a metal base. Since the enamel surface of the bowl is, to some extent, brittle, gaskets 21 are provided beneath the heads of bolts 20; and pad 24 of rubber or other suitable material is placed over flange 18, between it and the bowl.

A plate 26 having upwardly turned arm portion 32 is hinged at pins 28 to valve body 10. The plate 26 pivots about pins 28, and may be swung upward to provide access to valve cover plate 34 and the valve assembly, as will be discussed hereinafter. Also, since the plate 26 may be swung upward away from the bowl 16, easy cleaning of the bowl is provided. When in its rest position, the plate extends downwardly into bowl 16, but does not touch the bottom or sides of the bowl. An inwardly extending dimple 30 is formed in upward arm portion 32 in such a position, and to such a depth, as to co-act with the valve assembly as will be discussed hereinafter.

A valve cover plate 34 is held by screws 36 to face 38 of valve body 10. Valve cover 34 has an outstanding spigot 40 which is formed in the cover plate, and a hole 42 is punched through the plate. Valve sleeve 44 is situated behind valve cover plate 34 in contact with the rear side thereof, and extends inwardly into the valve body 10. A rib 45 is formed on the back surface of cover plate 34, and serves as a locating device to ensure the proper orientation of valve sleeve 44. The rib 45 is shown in ghost outline in FIGURE 2. A valve stem 46 is adapted to fit into valve sleeve 44; and valve spring 48 is fitted by interference fit to tail 50 of valve stem 46, and extends into the interior of valve body 10. As is more evident in FIGURES 4 or 5, valve spring 48 contacts the back wall of interior water cavity 51 of the valve body 10. An exterior cavity 96 is formed in face 38, and extends around the outside of the valve sleeve and behind face plate 34.

Valve sleeve 44 is illustrated in detail in FIGURE 2; and comprises an outer collar 52 of larger diameter than the body portion 54 of the valve sleeve. Slot 56 is cut into collar 52 for its total depth as shown, and a small groove 58 is cut into the face of collar 52 diametrically opposite to slot 56. When the valve sleeve is in position, keyed by rib 45, slot 56 is at the top and groove 58 at the bottom orientation. A further slot 60 is cut into the rear of body portion 54 at the opposite end of the valve sleeve from groove 58. An annular groove 64 is provided in the outside circumference of body portion 54 and is dimensioned so as to accommodate an O-ring 66. O-ring 66 fitting in annular groove 64 assures a snug fit of the valve sleeve 44 in recess 68 behind front face 38 of valve body 10. In addition, the interior of valve sleeve 44 provides an upstanding valve seat 70 which extends into the valve sleeve and will be discussed in greater detail hereafter.

Valve stem 46 comprises a tail 50 and a body portion 72 having a face 74 thereon. Four wings 76 are provided in valve stem 46 and define four external valve stem cavities 78. An outstanding collar 80 is provided between body portion 72 and tail 50 of the valve stem 46, and an O-ring gasket 82 fits over the valve stem body 72 and against collar 80. A front face 62 on collar 80 and O-ring gasket 82 are adapted to sit against valve seat 70 when the valve is in its closed position as illustrated in FIGURE 4, and the outside diameter of collar 80 is substantially equal to the interior diameter of body portion 54 of valve sleeve 44 behind valve seat 70.

A threaded fitting 84 is provided in the top of valve body 10 to receive a water pipe and to connect the animal watering pan of this invention to a pressure water system. Alternatively, the water source may be connected to valve body 10 at fitting 86 provided in the bottom of the valve. Whichever of fittings 84 or 86 is not used is closed with a threaded cap or plug to provide the necessary water-tight seal. In addition, a hole 88 is provided in plate 26 to permit the animal to see the bottom of the bowl, thereby inducing it to drink without uneasiness.

Bowl 16 is provided with a turned rim 90 so as to eliminate any sharp edges which might cause injury to the animal. It will be noted also that the interior corners 92 in water cavity 51 are rounded as will be discussed hereafter.

When an animal wishes to drink from the watering pan of this invention, it puts its face into bowl 16 and its nose strikes plate 26. As soon as pressure is exerted on plate 26, the operation of the valve begins, and water starts to flow into the bowl 16. That operation is as follows.

Face 74 of valve stem 46 extends through hole 42 in face plate 34 and extends toward the rear side of bead 30. Valve spring 48 acts against the rear side of collar 80 and maintains the valve in a closed position unless the spring 48 is depressed. As pressure is placed on plate 26, a swinging motion around pins 28 begins. As the arm 32 swings backwards, bead 30 contacts face 74 of valve stem 46 and pushes the valve stem back against the action of valve spring 48.

FIGURES 4 and 6 illustrate the relative positions of arm 32, bead 30, face 74, valve stem 46, valve sleeve 44, slot 60, valve spring 48, collar 80, O-ring gasket 82 and collar face 62 when the valve is in its closed position. It will be noted that bead 30 is just clear of face 74 so that valve spring 48 forces O-ring gasket 82 into valve seat 70, and assures that the valve is closed. It will also be noted that collar 80 overlies the inner end of slot 60 in valve sleeve 44.

FIGURES 5 and 7 illustrates the valve in an open position. In this case, it is noted that bead 30 is forcing valve stem 46 backwards against the action of valve spring 48, thereby unseating O-ring gasket 82 from valve seat 70, and moving collar 80 backwards along slot 60. An opening into the interior of valve sleeve 44 is thereby effected, and communication is established between water cavity 51 and spigot 40. The maximum limit of backwards travel of valve stem 46 is reached when face 74 is flush to the front of valve cover plate 34, as indicated in FIGURE 5.

Water enters valve sleeve 44 through the opening defined by slot 60, between its inner end and collar 80. As the water enters valve sleeve 44 through slot 60, it begins a labyrinthine flow which is as follows. From slot 60, the water flows through the four external cavities 78 and around valve stem 46, past valve seat 70. As the water approaches the rear side of valve cover plate 34, most of it flows upwards through slot 56 in collar 52 of valve sleeve 44: while some water may flow downwards through groove 58, most flows upward through slot 56 due to their relative sizes. As the water flows out of the interior of valve sleeve 44, it enters an exterior water cavity 96. It should be noted that cavity 96 is eccentric about the axis of valve stem 46, so that the volume of the cavity is smaller at the top than at the bottom; and that the outer surface of exterior water cavity 96 forms a baffle to the flow of water. Water flows downwards from slot 56 in outer cavity 96, and as it does, its velocity is reduced due to the larger enclosed volume in which it flows. The water exits through spigot 40, and flows into bowl 16 behind arm 32. As the water velocity is reduced even further as the water flows through spigot 40, a nearly splash-free flow into bowl 16 is achieved.

To ensure that little water will remain in the bowl when the animal is finished drinking, but that the water which it drinks will be fresh, it is necessary that the water comes up into the bowl, when it is flowing, sufficiently far to cover plate 26. It is also necessary that the amount of flow into the bowl be sufficient to accommodate the rate at which the animal drinks. It is obvious that the amount of water which will flow when the valve is fully open will depend on the pressure of the water system communicating with water cavity 51, and on the size of the opening through slot 60 and past collar 80 into valve sleeve 44. This amount of water may be expressed by the formula: $Q = K.A.P.$, where $Q$ is the flow measurement; $A$ is the area of the opening into valve sleeve 44; $P$ is the pressure of the water; and $K$ is a system constant. It is evident that as either $P$ or $A$ are increased, $Q$ will increase; and conversely, as $P$ or $A$ are decreased, $Q$ will decrease. It thus becomes evident that by properly choosing the value of $A$, the same $Q$ may be achieved for any water pressure. The valve structure of the present invention is therefore such that it may accommodate various water pressure systems ranging from a few p.s.i. up to several hundred p.s.i.

To properly provide the value of $A$, either the width or length of slot 60 may be altered, the length of valve stem 46 and of its travel in valve sleeve 44 may be altered; or any combination of the above. Valve stem and valve sleeve units may be provided which are suitable for any given water pressure, thereby assuring the purchaser that a given flow of water will be achieved for his own system.

The valve will close when the animal has had sufficient to drink, and releases the pressure against plate 26. As the valve begins to close, due to the action of valve spring 48 against valve stem 46, and collar 80 moves slowly forward along slot 60. The amount of water entering the interior of valve sleeve 44 is thereby progressively diminished, and reaches zero flow a discernible length of time after it has begun decreasing from full flow. This diminishing metering of water into the valve sleeve considerably reduces the likelihood of water hammer developing in the water system as the flow reaches zero.

Of the water remaining in outer cavity 96, some will drain through groove 58, thereby leaving an air space in the outer cavity 96, which air space may then be at a vacuum to the ambient. However, groove 58 permits air to bleed back into the cavity 96 thereby establishing a constant pressure to the ambient from the interior of valve sleeve 44 forward of collar 80. Since outer cavity 96 is normally filled with air rather than water, as the valve sits in its closed position, the cavity is thereby unaffected by freezing temperatures. However, if sufficient exposure to sub-freezing temperatures is achieved that the water in water cavity 51 freezes, the expanded volume of the ice within cavity 51 may be absorbed by flexing of valve cover plate 34. The interior volume of cavity 51 is relatively small, and therefore, the 10% increase in volume of water due to its change of state to ice will be quite a small amount. Provided the material of which cover plate 34 is made has such characteristics that it will recover to its original position after flexing, and has sufficiently high strength and resistance to temperatures, no harm will be done to the valve construction or the interior of the valve body. The rounded corners 92 of the water cavity 51 also permit a less restricted movement of the ice within the cavity 51, thereby reducing the chances of cracking within valve body 10. Also, the material of which the valve body 10 is made may be so chosen that it will, in itself, accommodate the expanded volume of ice in cavity 51.

By way of example, successful embodiments of the animal watering pan of the present invention have been made in which the valve body is of cast grey iron; and the valve stem 46, valve sleeve 44, and valve cover 34 are made of moulded acetyl resin. The plate 26, arm 32, and bowl 16 may be made from any convenient plastic or metal which provides sufficient rigidity, in addition to the porcelained enamel bowl as discussed above.

As mentioned above, the water supply may be connected to the valve body 10 at either of fittings 84 or 86. Whichever fitting is chosen is done so as a matter of convenience with no effect on the operation of the valve. However, since the valve stem and valve sleeve are in a substantially horizontal orientation when in their operating position, there is considerably less likelihood of particles of dirt or pipe shavings, etc. from lodging on the valve seat. Additionally, it is a simple matter to clean the interior of the valve body merely by shutting off the water supply and removing the cover plate 34 and the valve assembly to flush out the interior cavity 51.

Other actuating means may be provided to initiate and maintain the flow of water through the valve assembly. Such alternative means may include float control, remote solenoid control, and others; provided only that valve stem 46 is forced backwards and held against valve spring 48 when flow of water through the valve is desired.

An animal watering pan, and a valve assembly therefor, has been discussed above. The animal watering pan and valve assembly of the present invention provide a splash-free filling of the bowl only when the valve is actuated; and when the flow of water is stopped, the gradual diminution of the flow serves to prevent water hammer in the pressure supply system. It is obvious that other modifications and alterations may be made to the disclosed device without departing from the spirit or scope of the appended claims.

The embodiments of the invention in which an exclusive property or privilege is claimed are defined as follows:

1. In a valve assembly, the combination comprising:
a valve body having an interior cavity, and means for connecting said cavity to an external source;
a valve sleeve projecting at a first end through an opening provided in said valve body and retained therein with said first end terminating within said interior cavity; said valve sleeve containing a valve seat spaced inwardly from said first end; a valve stem co-operating with said valve sleeve having a seatable valve thereon, said valve stem having a plurality of upstanding wings in the body portion thereof defining a like plurality of external valve stem cavities on the periphery of said body portion;
means biasing said seatable valve to the closed position;
valve actuation means pivotally mounted with said valve body and adapted to move against said biasing means by pushing against an outer end of said valve stem;
a cover plate mounted on said valve body and contacting a second end of said valve sleeve, and forming between said cover plate and said valve body and around said second end of said valve sleeve an exterior cavity; outlet means for said exterior cavity provided in said cover plate;
said valve sleeve having first slot means formed in an end portion of said first end to provide communication between said interior cavity and the interior of said valve sleeve past said valve seat, and having second slot means formed in an end portion of said second end to provide communication between the interior of the valve sleeve and said exterior cavity;
said valve stem and seatable valve being movable within said valve sleeve upon movement of said valve actuation means, and having an upstanding collar formed thereon adjacent said seatable valve which co-operates with said first slot means in said valve sleeve to effect a closeable opening to permit communication between said interior cavity of the valve body and the interior of said valve sleeve past said valve seat only upon movement of said valve actuation means against said outer end of the valve stem to shift the valve stem relative to the valve sleeve, and further permitting communication between the interior of said valve sleeve and said exterior cavity by means of said plurality of external valve stem cavities on the periphery of the body portion thereof.

2. A valve assembly as set forth in claim 1 including a bowl rigidly attached to the valve body, and said valve actuation means including a plate and arm means extending into said bowl.

3. The valve assembly as set forth in claim 2 wherein said valve actuation means comprises a dimple formed in said arm means.

4. The valve assembly of claim 3 wherein a groove is formed on said second end of said valve sleeve diametrically opposite said second slot means.

5. The valve assembly of claim 3 wherein said exterior cavity is eccentric about the axis of said valve sleeve so that the volume of said exterior cavity is less at the top than at the bottom thereof.

6. The valve assembly of claim 5 wherein said interior cavity in said valve body has a substantially rectangular cross-section, and the corners thereof are rounded.

References Cited

UNITED STATES PATENTS

| 1,479,499 | 1/1924 | Ferris | 119—75 |
| 1,743,719 | 1/1930 | Louden et al. | 119—75 |
| 1,744,007 | 1/1930 | Louden | 119—75 |

FOREIGN PATENTS

| 661,866 | 6/1938 | Germany. |
| 587,919 | 5/1947 | Great Britain. |

HUGH R. CHAMBLEE, *Primary Examiner.*